Patented Jan. 30, 1940

2,188,881

UNITED STATES PATENT OFFICE 2,188,881

PRODUCTION OF THE MALE SEXUAL HORMONE

Adolf Butenandt, Berlin-Dahlem, Germany, assignor to Schering Corporation, Bloomfield, N. J., a corporation of New Jersey No Drawing. Application April 21, 1938, Serial No. 203,466. In Germany October 23, 1931

21 Claims. (Cl. 260—397)

My invention relates to the production of male sexual hormone preparations, and more particularly to the production of the male sexual hormone in crystalline form and also of reaction products thereof.

The present application is a continuation in part of my copending applications Serial No. 638,389, filed October 18, 1932 and Serial No. 754,854, filed November 26, 1934.

It has for some time been recognized that oily extracts obtained in various ways contained a male hormone principle, but prior to the present invention these extracts have not been converted into a form in which they were available for use in human therapy. Although the importance of a male hormone substance in the treatment of hormone deficiency was recognized and many attempts were made to obtain this hormone material in useful form, no male hormone product was prepared, prior to the present invention, which could be employed in the treatment of human beings. Thus Pezard (Compt. Rend. Acad. D'Sci. 1911, page 1027) was the first to prepare a crude oily extract which he injected into gallinaceous birds (Gallinacéi) and from the observation of the comb growth established that the extract contained a male sexual principle. This extract could not, however, be used in medicine. Later on, Gallagher and Koch and their collaborators (Jour. of Biol. Chem. 84, page 495; Proc. of Intern. Congr. for Sex Research, London, 1930, pages 322 and 329) made further investigations on male hormone-containing materials employing various physical extraction methods, but likewise obtained only crude oily extracts which were unsuitable for use in human therapy. Other courses of investigation were pursued by Funk and his collaborators (American Jour. of Physiology, March, 1930, pages 440 to 449), who utilized various physical extraction methods and recommended the use of chloroform. However, up to the date of the present invention, the workers in this field were able only to provide relatively crude oily preparations which exhibited male sexual hormone properties, but failed to provide the art with a crystalline male sex hormone product, that is, one which not only had high potency but could be safely and reliably employed in human medicine.

It is the general object of the present invention to provide a process whereby the active male principles of these known oily preparations, which principles have been given various names by workers in this field, to indicate their male character, such as male sexual hormone, germinal gland hormone (Keimdruesen-hormon), etc., can be obtained in isolated crystalline form which not only possesses a decidedly higher efficiency than any preparations hitherto known containing a male sexual hormone component, but which, in contradistinction to these prior preparations, is suitable for administration in the human organism for the correction of male hormone deficiencies and without any untoward effects.

It is a further object of the invention to provide a method whereby readily isolatable reaction products of substances having male hormone characteristics, from which the male sexual hormone is readily recoverable in crystalline form, can be obtained in good yield and likewise in crystalline form.

Other objects of the invention and the manner in which the same are attained will appear from the following description.

The prior methods, all of which involved physical or mechanical extraction or removal of inactive or toxic bodies from the starting materials, having failed to yield a substance which was available for use in medicine, it occurred to me to attempt to convert the male hormone component contained in the known oily extracts into a compound or compounds whose properties, especially their solubilities, differed more widely from those of the accompanying substances than did the properties of the original hormone material, so that an efficient separation of such hormone reaction product from the foreign substances could be effected. Accordingly, in contradistinction to the purely physical methods of concentration or extraction heretofore employed, the present invention is directed to the treatment of the known, relatively crude oily extracts by chemical means, thereby to convert the male hormone component into a compound or compounds which can be more readily isolated from the accompanying substances.

Since the composition of the male sexual hormone component present in the oily extract, or even any characteristic group of such compound, was altogether unknown prior to this invention, the prior art gave no leads as to the method to be pursued in any chemical attack on such compound. It is doubtless for this reason that prior methods of producing male hormone extracts were limited to physical treatments. Obviously, the reactions to which the oily extracts could be subjected were almost unlimited in number; and further, even if the hormone substance itself entered into any particular reaction, it was impossible to predict either that the new compound could be any more readily separated from the accompanying inactive or otherwise undesirable substances than the original hormone material, or that the hormone material could be recovered, without diminution or destruction of its activity, from the resulting reaction products. The physical methods of separation having been, however, without satisfactory result, it seemed to me that only an approach along chemical lines could solve the problem of producing a male hormone material which could be employed in human medicine.

I have found that by the treatment of the known crude oily extracts with hydroxylamine, hydrazine and the derivatives of these compounds including phenylhydrazine, diphenylhydrazine, semicarbazide, thiosemicarbazide, etc., compounds are produced having a much greater difference in solubility as compared with the accompanying substances in the oily extract than did the original hormone component, such compounds being usually less soluble in certain solvents than the accompanying substances and thereby being readily separable therefrom. I have found further that upon treatment of these newly formed compounds with acids, especially after recrystallization thereof from solvents, a decomposition product is obtained which exhibits male sex hormone properties of high potency. This product can now be further worked up, as by fractional crystallization or fractional distillation in a high vacuum to yield a crystalline substance representing a male sex hormone in isolated form, such product being capable of administration into the human organism by known methods without untoward effects.

The reagents mentioned hereinabove have the common property of forming condensation products with ketones, such condensation products being split up by acid hydrolysis to liberate the free ketones. The reaction of the male sex hormone principle contained in the oily extracts with these known ketone reagents for the first time established that the male sex hormone or hormones contained in the extracts are ketonic in character. For the separation of the keto-containing male sex hormone any known ketone reagent can accordingly be employed, such reagents being characterized by the presence of an amino group which is capable of condensing with a keto group under elimination of water. I prefer, however, to employ those ketone reagents which, like those enumerated above, form relatively insoluble condensation products with the male hormone component.

I have found further that the separation of male sexual hormone material from accompanying substances with the aid of ketone reagents is not restricted to the hormones themselves, but can be applied also to their keto-containing derivatives, for example, compounds in which chlorine replaces the hydroxy group present in such hormones. Thus, mixtures containing 3-chlor-dehydroandrosterone can be treated with a ketone reagent in known manner to produce relatively insoluble condensation products which, after isolation, can be hydrolyzed with acids to liberate the hormone derivative. The hydroxy group can, of course, be replaced by other groups, particularly those which, on hydrolysis, are replaceable by a hydroxy group.

As already indicated, any of the known crude, oily preparations containing a male sexual hormone principle can be employed as the starting material in my process. For best results, these preparations should be as concentrated as possible, such concentration being effected, for example, in accordance with the process described in my United States Patent No. 2,015,099, filed simultaneously with my above mentioned application Serial No. 638,389.

The invention will be described in greater detail with the aid of the following examples, which are presented purely by way of illustration and not by way of limitation.

*Example 1*

A crude oily extract obtained, for example, according to the method of Funk et al. (supra), and preferably, though not necessarily, further concentrated in accordance with the method described in my above mentioned patent, so that it attains an efficiency of about 0.3 to 0.4 mg. per capon unit, the original source of the extract being, for example, male urine, is dissolved in absolute alcohol together with 3 grams of hydroxylaminehydrochloride and 3.5 grams anhydrous sodium acetate. The insoluble sodium chloride formed in this reaction is removed by filtration and the alcoholic solution is boiled for several hours whereupon it is concentrated to about one-half of its volume, and the oxime formed in the reaction is carefully precipitated by the addition of water. On recrystallizing the oily oxime from 96% alcohol, there are obtained white crystals melting from 215 to 221° C. From this oxime the hormone can be recovered by dissolving the oxime in about the ten-fold quantity of alcohol to which has been added an equal quantity of oxalic acid. After from two to three hours of boiling and subsequent dilution with water, the organic component is precipitated and can be isolated from the reaction mixture by means of solvents, such as ether. The mixture of ketones thus obtained can be decomposed into its components by fractional crystallization or fractional distillation in a high vacuum, for instance, of 0.0001 mm. of mercury. The temperature at which the desired hormone will pass over, will depend, of course, upon the degree of vacuum employed and upon the characteristics of such hormone, and for any particular vacuum can be readily determined, as will be obvious to those skilled in the art. Where the starting material, as given in this example, originated in male urine, the product will pass over at pressure of 0.0001 mm. of mercury, at a temperature of about 70 to 80° C. and will be obtained in the form of white platelets having a gloss similar to that of mother-of-pearl, and melting at 178° C. The particular male hormone so obtained has been named androsterone and is a saturated keto-hydroxy-dimethyl - cyclopentano - polyhydro - phenanthrene compound, having an efficiency in the capon comb test of about 150–200 $\gamma$.

*Example 2*

30 grams of a "petroleum ether portion" obtained on working up extracts produced from about 4000 liters of the urine of male individuals by acidification thereof and extraction with chloroform, as described, for example, by Funk, Harrow & Leywa "Proc. Soc. Exp. Biol. & Med." 26 (1929), 569, followed by isolation of the androsterone contained in such extracts, as described, for example, in my above mentioned Patent No. 2,015,099, said portion being practically without any physiological activity, are digested with 4 cc. of benzene on the wather bath, mixed with 300 cc. of petroleum ether and filtered after some time. The precipitate is re-dissolved and re-precipitated in the same manner, and the combined petroleum ether solutions are concentrated in a vacuum to 250 cc. and are subsequently extracted 10 times with about 100 cc. of 85% alcohol (denatured with methanol). The combined alcohol portions, after evaporation and drying, leave about 10 g. of a residue which still contains some alcohol; the residue is heated with a solution of 5 g. of semicarbazide acetate in 70 cc. of absolute alcohol for about 12 hours on a water bath so gently that the reaction mass is inspissated during this time to a syrupy consistency. After cooling, it is triturated with a little cooled alcohol, is filtered off by suction, and the crystal paste collected on the filter, and alternately washed with cooled alcohol, ether and hot water. The crude semicarbazone obtained thereby is in the form of a yellowish crystalline powder. The decomposition point lies about 240° C.

The crude semicarbazone can be recrystallized by extraction with propanol in a Soxhlet apparatus and is obtained in white laminas of the melting point 275° C. For the purpose of further working up the crude semicarbazone, 1 g. of the same is dissolved, while stirring, in 35 cc. of dilute alcoholic sulfuric acid (10 cc. of concentrated sulfuric acid, 15 cc. of water, 75 cc. of alcohol) or in 35 cc. of an alcoholic-aqueous hydrochloric acid (50 cc. of concentrated hydrochloric acid, 50 cc. of alcohol) and is heated for 15 to 20 minutes on the boiling water bath. After diluting with water, it is extracted with ether, the ethereal solution is washed with bicarbonate and water, is dried and evaporated to dryness. The crude cleavage product (about 0.63 g.) is triturated with very little freshly distilled ethanol and is caused to crystallize by cooling. The chloroketone which precipitates is recrystallized from freshly distilled methanol until it shows the constant melting point of 156.5–157.5° C. (not corrected); it is readily soluble in ether, acetone, chloroform, dioxane, acetic acid ester, soluble in petroleum ether, difficultly soluble in cold, readily in hot alcohol. The chloroketone forms elongated prisms which sublimate from 110° C. on at a pressure of $10^{-4}$ mm.; it yields a yellow coloration with tetranitro methane, decolorizes a bromine-glacial acetic acid solution, exhibits a positive Beilstein test and in acetic acid anhydride with concentrated sulfuric acid a yellow coloration which rapidly changes to intensely pink.

The oxime of the chloroketone has a melting point of 168–169° C. The chloroketone itself is chlor-dehydroandrosterone.

The dehydroandrosterone compound can be isolated also by reacting the extracted mixture with other ketone reagents, such as phenylhydrazine, and the like.

The isolated compound has the general formula $C_{19}H_{27}OCl$ and can be converted to dehydroandrosterone having an efficiency in the capon comb test of about 600 γ and to androsterone in accordance with the process described in my copending application Serial No. 754,854.

Also other starting materials than the urine of male individuals can be used for isolating this and similar chloroketones wherein the starting materials had been previously subjected to the action of hydrochloric acid. In place of hydrochloric acid, also other hydrohalic acids or agents capable of yielding hydrogen halide can be used. The crude extracts obtained according to Funk (supra) can be worked up in the manner described above, and also crude products obtained synthetically, for example, by the oxidation of sterines. It is also possible to subject the entire residue directly, without preliminary treatment with solvents, to the treatment with reagents for keto groups and to work up the reaction products obtained in the manner above described.

I claim:

1. The method of isolating a male sex hormone which comprises subjecting an oily starting material containing such hormone to condensation with a compound having a free amino group and being therefore capable of reacting with the carbonyl group of a ketone under separation of water, isolating the resulting condensate, and decomposing the same to split off the hormone.

2. The method of isolating a male sex hormone which comprises subjecting an oily starting material containing such hormone to condensation with a compound having a free amino group and being therefore capable of reacting with the carbonyl group of a ketone under separation of water, isolating the resulting condensate, decomposing the same to split off the hormone, and subjecting the product to fractional sublimation in vacuo to separate the hormone from other ketonic substances that may be present.

3. The method of isolating a male sex hormone which comprises subjecting an oily starting material containing such hormone to condensation with a compound of the group consisting of hydroxylamine and hydrazine and such derivatives of these two compounds as contain a free amino group and are therefore capable of reacting with a ketone under separation of water, isolating the resulting condensation product, and decomposing the same to liberate the free hormone material.

4. The method of isolating a male sex hormone which comprises subjecting an oily starting material containing such hormone to condensation with a compound of the group consisting of hydroxylamine and hydrazine and such derivatives of these two compounds as contain a free amino group and are therefore capable of reacting with a ketone under separation of water, isolating the resulting condensation product, decomposing the same to liberate the free hormone material, and subjecting the latter to fractional sublimation in vacuo to isolate the hormone from any accompanying ketonic substances that may be present.

5. The method according to claim 1, wherein the condensation product is crystallized from a solvent prior to the decomposition of such product.

6. The method according to claim 3, wherein the condensation product is crystallized from a solvent prior to the decomposition of such product.

7. The method of producing a crystalline male sex hormone which comprises subjecting an oily starting material containing the hormone to condensation with a compound of the group consisting of hydroxylamine and hydrazine and such derivatives of these compounds as contain a free amino group and are therefore capable of reacting with a ketone under separation of water, crystallizing the condensation product, decomposing the same to split off the hormone, subjecting the resulting product to fractional distillation in vacuo and causing crystallization of the hormone fraction of the distillate.

8. The method of isolating a member of the group consisting of male sex hormones and keto-containing derivatives thereof, wherein the hydroxyl group has been replaced by a group which upon hydrolysis is convertible to the hydroxyl group, from mixtures containing the same, which comprises reacting the mixture containing the hormone or its derivative with a compound having a free amino group and being therefore capable of condensing with the carbonyl group of a ketone under separation of water, and decomposing the resulting condensation product to split off the hormone or its keto-containing derivative.

9. The method of producing the male sex hormone androsterone in crystalline form, which comprises subjecting an oily starting material containing the hormone to condensation with a compound containing a free amino group and being therefore capable of reacting with the carbonyl group of the hormone under separation of water, isolating the resulting condensation product, crystallizing the same from a solvent therefor, decomposing the crystalline condensation product to split off the free ketonic material, and subjecting the latter to fractional sublimation to isolate the androsterone fraction.

10. The isolated condensation product of a male sex hormone and a compound having a free amino group and capable of reacting with a carbonyl group of a ketone under separation of water.

11. The isolated condensation product of a member of the group consisting of a male sex hormone and keto-containing derivatives thereof, wherein the hydroxyl group has been replaced by a group which upon hydrolysis can be converted to the hydroxyl group with a compound having a free amino group and capable of reacting with a carbonyl group of a ketone under separation of water.

12. The crystalline condensation product of a male sex hormone and a compound having a free amino group and capable of reacting with a carbonyl group of a ketone under separation of water.

13. The isolated condensation product of a saturated keto-containing dimethyl cyclopentano polyhydro phenanthrene compound having male sex hormone properties and a compound having a free amino group and capable of reacting with a carbonyl group of a ketone under separation of water.

14. The isolated condensation product of an unsaturated keto-containing dimethyl cyclopentano polyhydro phenanthrene compound having male sex hormone properties and a compound having a free amino group and capable of reacting with a carbonyl group of a ketone under separation of water.

15. The isolated semi-carbazone of a male sex hormone.

16. As a therapeutic agent capable of being administered into the human organism for the correction of hormone deficiency without detrimental side effects, an isolated ketonic male sex hormone prepared in accordance with claim 1.

17. As a therapeutic agent capable of being administered into the human organism for the correction of hormone deficiency without detrimental side effects, an isolated ketonic male sex hormone, said hormone having an efficiency at least as high as that corresponding to about 600 $\gamma$ in the capon comb test.

18. As a therapeutic agent capable of being administered into the human organism for the correction of hormone deficiency without detrimental side effects, an isolated ketonic male sex hormone of the general formula $C_{19}H_{30}O_2$ and the melting point 178° C., said product being obtained in the form of white platelets on distillation under high vacuum and having an efficiency of the order of 150-200 $\gamma$ in the capon comb test.

19. The method of producing a crystallized male sexual hormone which comprises effecting condensation of a crude oily starting material containing such hormone with a compound comprising a free amino group and being therefore capable of reacting with the carbonyl group of a ketone under separation of water, isolating and recrystallizing the condensation product, decomposing same to split off the hormone and purifying this hormone by fractionated sublimation in vacuo.

20. The method of producing a crystallized male sexual hormone which comprises effecting condensation of a crude oily starting material containing such hormone with a compound of the group constituted by hydroxylamine hydrochloride and hydrazine and such derivatives of these two compounds as comprise a free amino group and are therefore capable of reacting with a ketone under separation of water, isolating and recrystallizing the condensation product, decomposing same to split off the hormone and purifying this hormone by fractional sublimation in vacuo.

21. The method of producing a crystallized male sexual hormone which comprises effecting condensation of a crude oily starting material containing such hormone with a compound of the group constituted by hydroxylamine hydrochloride and hydrazine and such derivatives of these two compounds as comprise a free amino group and are therefore capable of reacting with a ketone under separation of water, isolating and recrystallizing the condensation product, decomposing same to split off the hormone and subjecting said hormone to fractional distillation in a high vacuum and causing crystallization of the distillate.

ADOLF BUTENANDT.